US006710893B1

(12) United States Patent
Hou et al.

(10) Patent No.: US 6,710,893 B1
(45) Date of Patent: Mar. 23, 2004

(54) AUTOMATED SYSTEM AND METHOD OF TESTING A FACSIMILE MACHINE

(75) Inventors: Xiaoan Hou, Santa Clara, CA (US); Yahya Hamadani, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/432,179

(22) Filed: Nov. 2, 1999

(51) Int. Cl.⁷ .................... B41B 1/00; G06F 11/00; G01D 3/00
(52) U.S. Cl. ................ 358/1.15; 358/504; 358/405; 714/25; 702/108
(58) Field of Search ................. 358/1.15, 504, 358/406, 405, 404; 714/25, 1, 30, 38, 47; 702/108, 119, 121, 122, 123

(56) References Cited

U.S. PATENT DOCUMENTS

| 4,964,124 A | * | 10/1990 | Burnett | 714/44 |
| 4,965,676 A | * | 10/1990 | Ejiri et al. | 358/404 |
| 5,077,582 A | * | 12/1991 | Kravette et al. | 399/10 |
| 5,568,407 A | * | 10/1996 | Hass et al. | 702/118 |
| 5,694,528 A | * | 12/1997 | Hube | 358/1.14 |
| 5,774,678 A | * | 6/1998 | Motoyama | 358/442 |
| 5,818,603 A | * | 10/1998 | Motoyama | 358/1.15 |
| 6,134,017 A | * | 10/2000 | Schlank et al. | 358/1.15 |

\* cited by examiner

Primary Examiner—Edward Coles
Assistant Examiner—Jason Sherrill
(74) Attorney, Agent, or Firm—Oblon, Spivak, McClelland, Maier & Neustadt, P.C.

(57) ABSTRACT

An automated system and method for testing a facsimile machine using an additional port on the facsimile machine for communication with a computer which controls the testing. The system includes a user interface with a plurality of commands which a user can select for testing the facsimile machine. The present invention inputs, from the user, a testing sequence which includes the commands for testing the facsimile machine and transmits the commands for testing the facsimile machine from the computer to the facsimile machine through the additional port. The facsimile machine executes the transmitted commands to perform requested testing, collects testing conditions and test results, and communicates the testing conditions and test results to the computer through the port. The computer then logs the testing conditions and test results, and communicates the results to the user.

24 Claims, 15 Drawing Sheets

300

New Test or Test Modification Form

- Protocol Selection — 302
  - ● Asynchronous   ○ Compatible   ○ RICOH (MG3)   ○ MILSTD

- Compression — 304
  - ○ Un-compressed   ○ MH Coding   ● MR Coding   ○ MMR Coding

- Asynchronous Protocol — 306

| | | | | |
  |---|---|---|---|---|
  | Line Speed | 19200 BPS | | Duplex | FULL |
  | Time Out (sec) | 30 | | Line Delay | 0 |
  | EFC | ON | | Flow Control | RTS/CTS |

- Synchronous Protocol — 308

| | | | | |
  |---|---|---|---|---|
  | Baud Rate | | | Line | |
  | Hand Shake | | | Duplex | |
  | FEC | | | | |

- Printing Quality — 310

| | | | | |
  |---|---|---|---|---|
  | Resolution | STANDARD | | Halftone | OFF |
  | | | Number of Pages to be Sent | 3 | |

[ Apply ] 320    [ Default Value ] 322    [ Cancel ] 324

Fig. 6

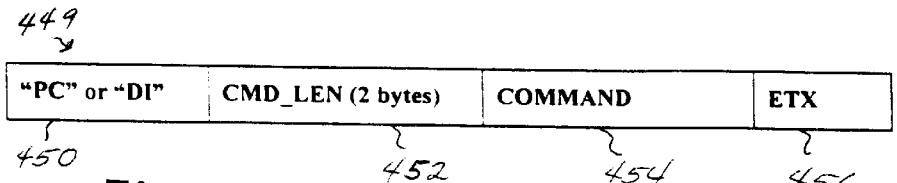
Fig. 9A
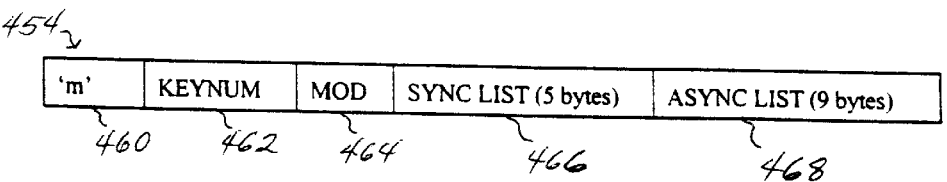
Fig. 9B(1)
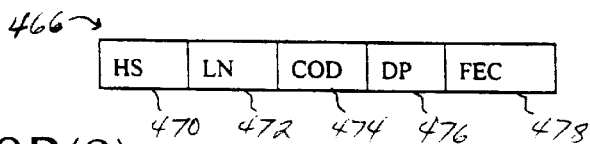
Fig. 9B(2)
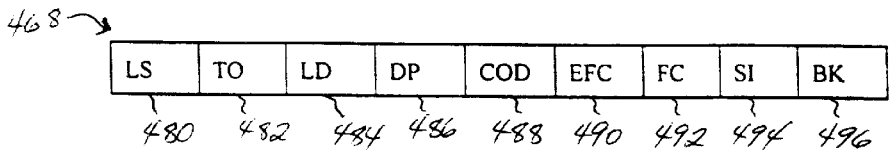
Fig. 9B(3)
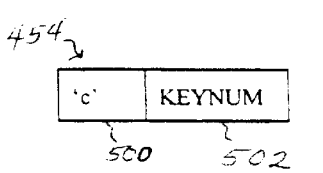
Fig. 9C
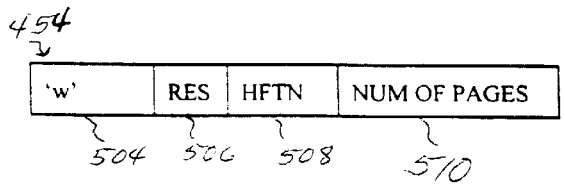
Fig. 9D
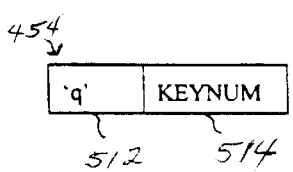
Fig. 9E
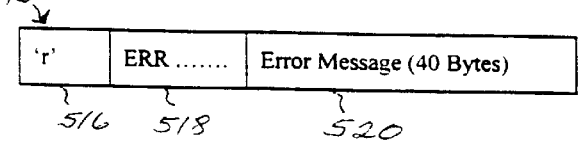
Fig. 9F
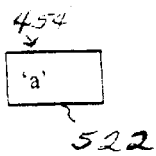
Fig. 9G

Bug Report Form (Use ✓ to select)

| | | | | |
|---|---|---|---|---|
| Code Version | FCU Version #: | | DIC Version #: | |
| Protocol | ☐ Asynchronous | ☐ Compatible | ☐ Ricoh (MG3) | ☐ MILSTD |
| F.U.T. | ☐ SFX4800 | ☐ Receive | ☐ Transmit | |
| Terminal B | ☐ SFX3800 | ☐ SFX80M | ☐ F.U.T. | |
| Compression | ☐ MR | ☐ MH | ☐ Uncompressed | |
| Resolution | ☐ Standard | ☐ Detailed | ☐ Halftone | |
| Duplex | ☐ Full | ☐ Half | | |
| Pages | ☐ Single | ☐ Multiple Pages | | |
| Baud Rate | ☐ 2400 | ☐ 4800 | ☐ 9600 | ☐ 19,200 |
| | ☐ 32,000 | ☐ 38,000 | ☐ 56,000 | ☐ 64,000 |
| DCE | ☐ MME | ☐ STUIII | ☐ Short Haul Modem | |
| Reproducibility | ☐ High | ☐ Medium | ☐ Low | |
| FEC | ☐ Yes | ☐ No | | |
| HSK | ☐ Yes | ☐ No | | |
| Failure Count | | | | |
| Failed Page # | | | | |
| Error Code | | | | |

Observation (or Symptoms)

Comments

| Enclosed In Docs | ☐ Yes | ☐ No |
|---|---|---|

Tested By _____ Date _____

Fig. 11

```
BUG No.          : 006            Reported by :Sean Hou
------------------------------------------------------------
TEST Item No.    : 2-2-1          Date : 06/09/98
------------------------------------------------------------
ROM Version      : FCU - V.1.00  6/8/98
                   DIC - V.1.08  6/8/98
------------------------------------------------------------
Protocol         : (Async)
Compression      : (MH)
Resolusion       : (Dtl)
Halftone         : (Off)
FEC              : (On)
------------------------------------------------------------
Comm. Speed      : (1200)
Terminal B       : (SFX4800M)
DCE              : (MME;BLACK BOX SME-4)
Others           :
------------------------------------------------------------
Description      :

Fax on the transmission side terminated abnormally on the 2nd page tran-
smission.

TX Side DI PROTOCOL DUMP LIST:

TX-      I        02 01 01 03 02 00 00
  -RX       ACK
  -RX      J      02 01 01 03 02 00 00
TX-        ACK
TX-      N        02 01 00 FF FF
  -RX       ACK
TX-      E        03 51 52 45 43 45 49 56 45 20 55 4E 44 45 46 49    .Q
RECEIVE UNDEFI
                  4E 45 20 43 4F 4D 4D 41 4E 44 20 20 20 20 20 20    NE
  COMMAND
                  20 20 20 20 20 20 20 20 20 20
  -RX       ACK
  -RX      E      99 99 20 45 20 41 43 4B 4E 4F 57 4C 45 44 47 45    ..
E ACKNOWLEDGE
                  20 00
TX-        ACK

Possible Causes:
The connection between DIC and cable
============================================================
Corrected by     :                Date : 06/01/98
------------------------------------------------------------
ROM Version      : (FCU -    DIC - )
------------------------------------------------------------
Comment          :
```

Fig. 12

AUTOMATED SYSTEM AND METHOD OF TESTING A FACSIMILE MACHINE

BACKGROUND OF THE INVENTION

1. Field of the Invention

This invention generally relates to an automated system and method of testing an office machine. The invention more particularly relates to an automated system and method of testing a facsimile machine. The invention also relates to an automated system and method of testing a printer system.

2. Discussion of the Background

With the increase of electronic transmission of documents, secure transmission of documents via facsimile ("fax") has clearly become a significant business. In utilizing a secure facsimile machine, an important factor is the ability to easily and accurately test the operation of the machine for different modes and different speeds. Current testing of secure facsimile machines is done manually, and is a tedious, time-consuming operation which is prone to user errors. Using current techniques, the error recording and reporting is even more complicated. At least four secure fax protocols (e.g., Asynchronous Protocol, Military Standard Protocol (161D), Ricoh (MG3) Protocol, and Compatible Protocol) and at least three normal fax protocols (e.g., G3, G4 and Internet Fax Protocols) may be tested and each protocol has numerous modes. Speeds presently range from 1200 bits per second (BPS) to 64 K BPS, but higher speeds may be possible.

FIG. 1 is a flowchart of the present manual system testing process used by a human user. After starting, a user, in step 10, loads documents, which are a number of different pages, on the facsimile machine. The user, in step 12, manually sets a testing mode on the facsimile machine. In step 14, the user then manually sets a resolution of the facsimile machine, and the user, in step 16, manually starts the test. In step 18, the user manually records test results.

Step 20 determines whether an error was detected in the test results. A computer reads the error code sent from the fax machine. For example, if the error code is "0x00" (hexadecimal zero), the test is passed successfully. If the error code has a value other than zero, than at least one error occurred during the testing. The type of error which has occurred may be determined by searching an error code table. For example, if the error code is "0x01" then a timeout error has occurred, if the error code is "0x05" then the modem is not responding, if the error code is "0x12" then the end of data was not found, and if the error code is "0x19" then a checksum error has occurred. If step 20 determines that an error was not detected in the test results, control passes to step 30.

If step 20 determines that an error was detected in the test results, control passes to step 22, in which the user manually prints a communication log. The user, in step 24, then manually analyzes the error. In step 26, the user manually writes the bug report and types in an error code for the detected error, and in step 28, the user manually attaches, to the bug report, the communication log which was printed in step 22, which was discussed previously. Step 30 then determines whether the test is complete. If step 30 determines that the test is not complete, then control passes to step 10, which was discussed previously. If step 30 determines that the test is complete, control passes to the user's next task.

Thus, whether an error occurs or not, the computer checks whether all tests specified in the test sequence have been performed. If they have all been performed, then control passes to the user so that the user may select another test script file to perform another sequence of tests or exit the test control software.

Hundreds of tests may need to be performed for the complete functional testing of high speed secure facsimile machines. A single test of 5 pages at a line speed of 1200 bits per second (BPS), and with halftone requires approximately 4 hours of the user's time, with many more user hours required for reporting the results of the test. Also, human errors are inevitable during manual testing. For example, a user may press a wrong button, forget to press a button, or set a wrong testing mode. Results of such testing are not reliable. Compilation and tabulation of results of testing has conventionally been performed by entering the results into a computer manually, which is both time-consuming for the user, and prone to user errors in data entry.

SUMMARY OF THE INVENTION

Accordingly, an object of the present invention is to provide a novel and effective automated system and method of testing a facsimile machine.

A further object of the present invention is to provide a novel automated system and method of testing a facsimile machine by utilizing an extra port in a facsimile machine which is connected to a computer to automate the testing procedure.

A further object of the present invention is to provide a novel automated system and method of testing a facsimile machine by utilizing an extra port on the facsimile machine which is connected to a computer so that the computer gains access to the control portion of the facsimile machine to modify parameters and protocols, and to select the desired modes for testing options via specially designed commands.

A further object of the present invention is to provide a novel automated system and method of testing a facsimile machine by utilizing an extra port on the facsimile machine which is connected to a computer so that the computer gains access to the control portion of the facsimile machine to collect the success and failure report, and to log the event.

The present invention achieves these and other objects by connecting a local facsimile machine to a computer by utilizing an extra port, for example, a serial port, in the facsimile machine so that the testing may be automated by the computer. The computer then accesses the control portion of the facsimile machine to change parameters and protocols, and to select the desired modes for testing options by using specially designed commands.

First, a number of different pages are loaded on the local facsimile machine. The computer reads a test sequence from a test script file and follows the test sequence specified in the file to perform and monitor the entire testing process, thus eliminating the need for a user to manually perform the steps 12, 14, 16, 18, 20, 22, 24, 26, 28, and 30 which were discussed previously with regard to FIG. 1.

Since the present invention automates the testing of the facsimile machine, more tests may be performed without the requirement of a human attendant to monitor the progress of the testing. Automated testing of the facsimile machine may be extended beyond normal business hours, thus increasing the duration of system testing. An advantage of the present invention is that the facsimile machine utilization ratio is then increased, while decreasing the need for manual interaction.

Another advantage of the present invention is that a computer performs more reliable and more efficient tests than a human user. A properly programmed computer will not, for example, press a wrong button, forget to press a button, or set an incorrect testing mode, as a human user is likely to do in manual testing. Also, a computer, using automated testing, will log the tests as instructed, and will automatically generate an accurate and organized report of test results, as well as generating bug reports and, for example, electronically transmitting notifications to development engineers.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 illustrates an exemplary user interface for a selection dialog for testing parameters according to the present invention;

FIGS. 9A–9G are block diagrams of layouts for exemplary commands for the automated diagnostic testing;

FIG. 11 is an exemplary bug report form;

FIG. 12 is an exemplary bug report; and

DESCRIPTION OF THE PREFERRED EMBODIMENTS

Figure 2:
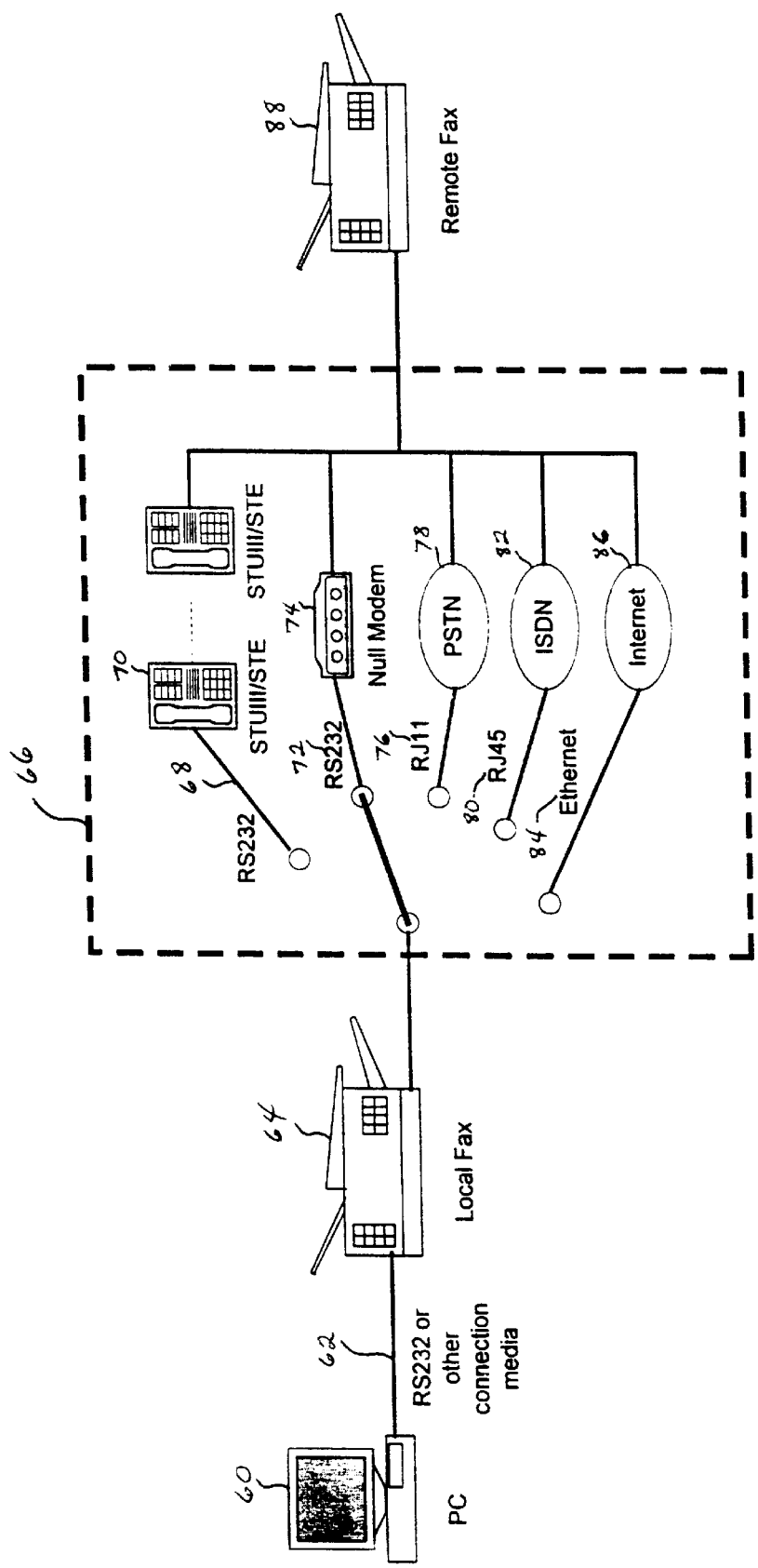
FIG. 2 illustrates an exemplary facsimile machine connected to a computer for automated testing.

Referring now to the drawings, wherein like reference numerals designate identical or corresponding parts throughout the several views, and more particularly to FIG. 2 thereof, there is illustrated an exemplary facsimile machine connected to a computer for automated testing. FIG. 2 illustrates an exemplary computer 60 for controlling the testing, connected to a facsimile machine 64 which is to be tested by way of an RS-232 or other connection media connection 62, for example, through a COM port of the computer 60 to a Digital Interface Card ("DIC") of the facsimile machine 64. The facsimile machine 64 is supplied with an additional serial port to accommodate the connection to the computer 60. The facsimile machine 64 to be tested is connected via a connection 66 to a remote facsimile machine 88.

As illustrated in FIG. 2, the connection 66 may, for example, include an RS-232 connection 68 to a Secure Telephone Unit/ Station Terminal Equipment (STUIII/STE) 70, an RS-232 connection 72 to a null modem 74, a Registered Jack 11 ("RJ-11") connection 76 to a PSTN 78, an RJ-45 connection to an Integrated Services Digital Network ("ISDN") 82, or an Ethernet connection 84 to an Internet 86. The connection 66 is then connected to the remote facsimile machine 88. While FIG. 2 illustrates these connection modes, the connection 66 may comprise any connection mode suitable for connecting two facsimile machines.

While this example shows the use of an RS-232 connection 62 to connect the facsimile machine 64 to the computer 60, any type of connection for connecting computers to devices may be used, including, for example, infra-red, Universal Serial Bus (USB), RJ45, RJ11, a parallel connection, and an Ethernet connection.

Figure 3:
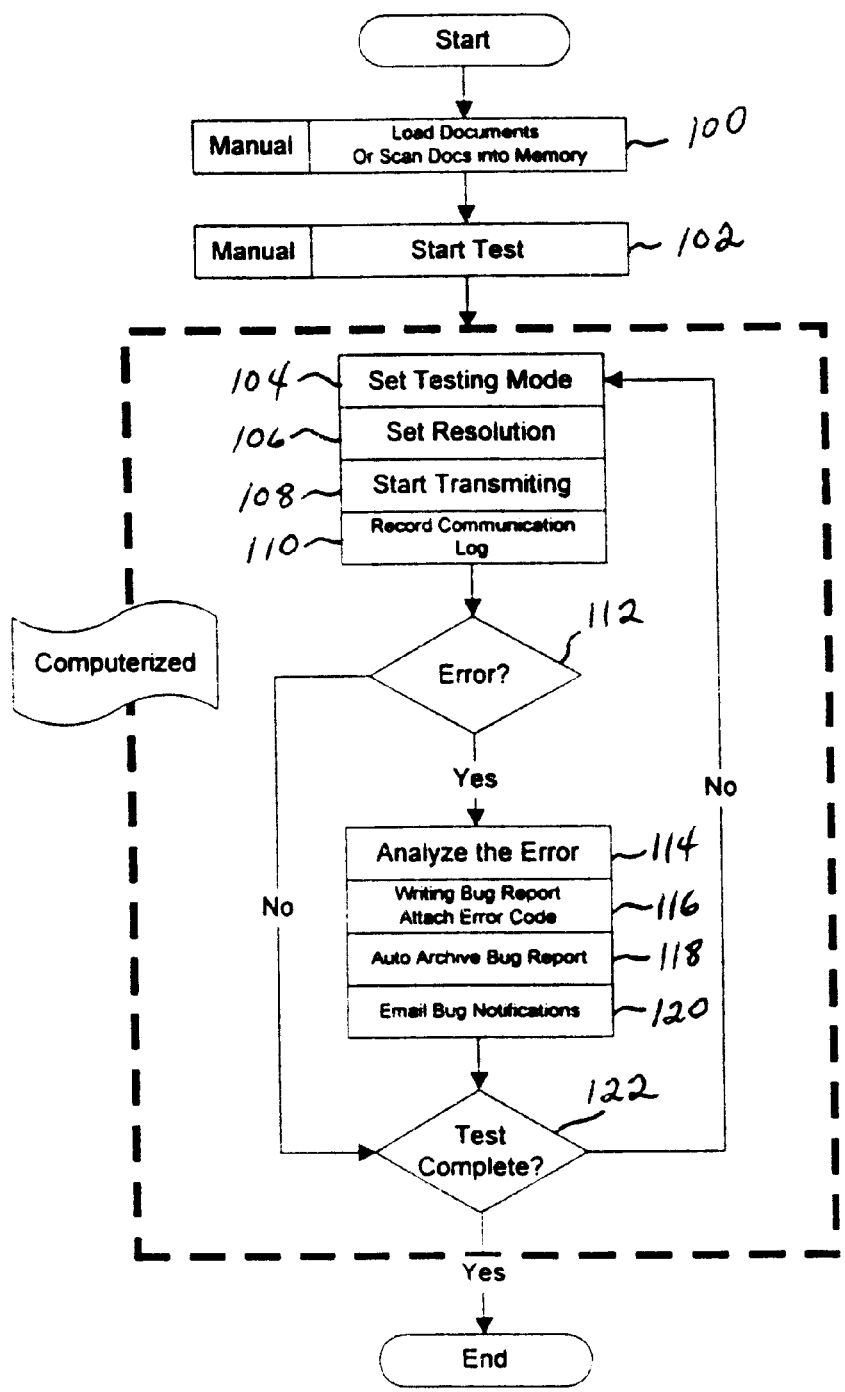
FIG. 3 is a flowchart of the automated method of testing of a facsimile machine of the present invention.

FIG. 3 is an exemplary flowchart of the automated method of testing of a facsimile machine of the present invention. After starting, in step 100, a user manually loads documents into the facsimile machine, for example, the facsimile machine 64 of FIG. 2, or scans documents into a memory. In step 102 of FIG. 3, a user manually requests the start of testing of the facsimile machine, for example, by entering a command to the computer 60 of FIG. 2, such as by pressing a start button 262 shown in FIG. 5, as discussed below.

Step 104 of FIG. 3 sets a testing mode for the facsimile machine. Step 106 sets the resolution of the facsimile machine. Step 108 then starts transmitting data from the facsimile machine, for example, from the facsimile machine 64 of FIG. 2 to the remote facsimile machine 70. Step 110 records a communication log. A communication log is a log of command or information exchange between a local fax machine 64 and a remote fax machine 88 of FIG. 2. An exemplary handshaking between a transmitting fax 64 and a receiving fax 88 is shown in FIG. 10B. In this context, the communication log is a record of the communication commands exchanged between the transmitting fax machine 64 and the receiving fax machine 88.

Step 112 determines whether an error has occurred in the transmission. When step 112 determines that an error has not occurred, control passes to step 122, as discussed below. When step 112 determines that an error has occurred, step 114 analyzes the error. Step 116 writes a bug report and attaches an error code. A bug report is an account of the facsimile machine failure under certain testing conditions. The bug report is used by a programmer to identify bugs in code. In this context, a bug report includes at least three components: a testing condition under which a fax machine failed to either transmit or receive, including protocol mode, compression, resolution, error code, etc.; observation of the failure; and a possible cause of the failure.

Step 118 then automatically archives the bug report, and step 120 electronically transmits the bug notifications to a predetermined user for service.

Figure 1:
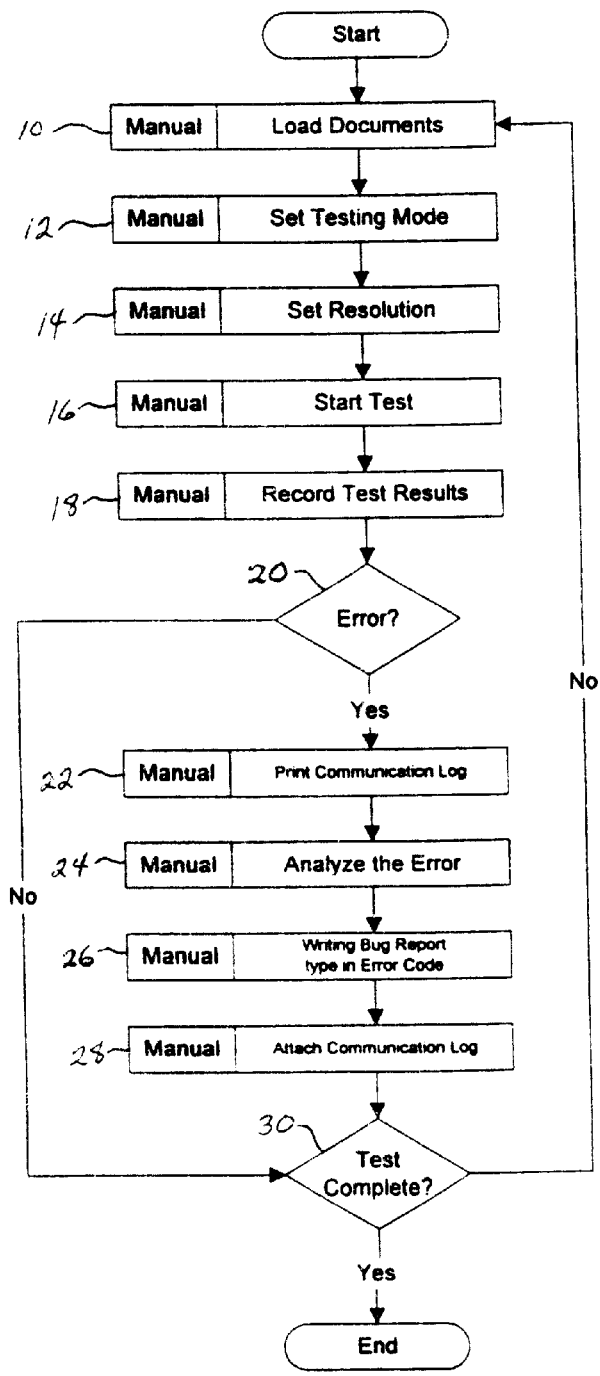
FIG. 1 is a flowchart of a related art manual method of testing a facsimile machine.

Step 122 determines whether the test is complete. When step 122 determines that the test is not complete, control passes to step 104 which was discussed previously. When step 122 determines that the test is complete, control passes, for example, to the user of the computer system. A unique feature of the present invention is that the steps 104, 106, 108, 110, 112, 114, 116, 118, 120, and 122, as discussed above with regard to FIG. 3, are computerized, and are controlled by, for example, the computer 60 shown in FIG. 2. The automation of these steps results in significant savings of time and affords an advantage in efficiency and accuracy of reported results over the manual testing techniques used previously, as discussed with regard to FIG. 1.

Figure 4:
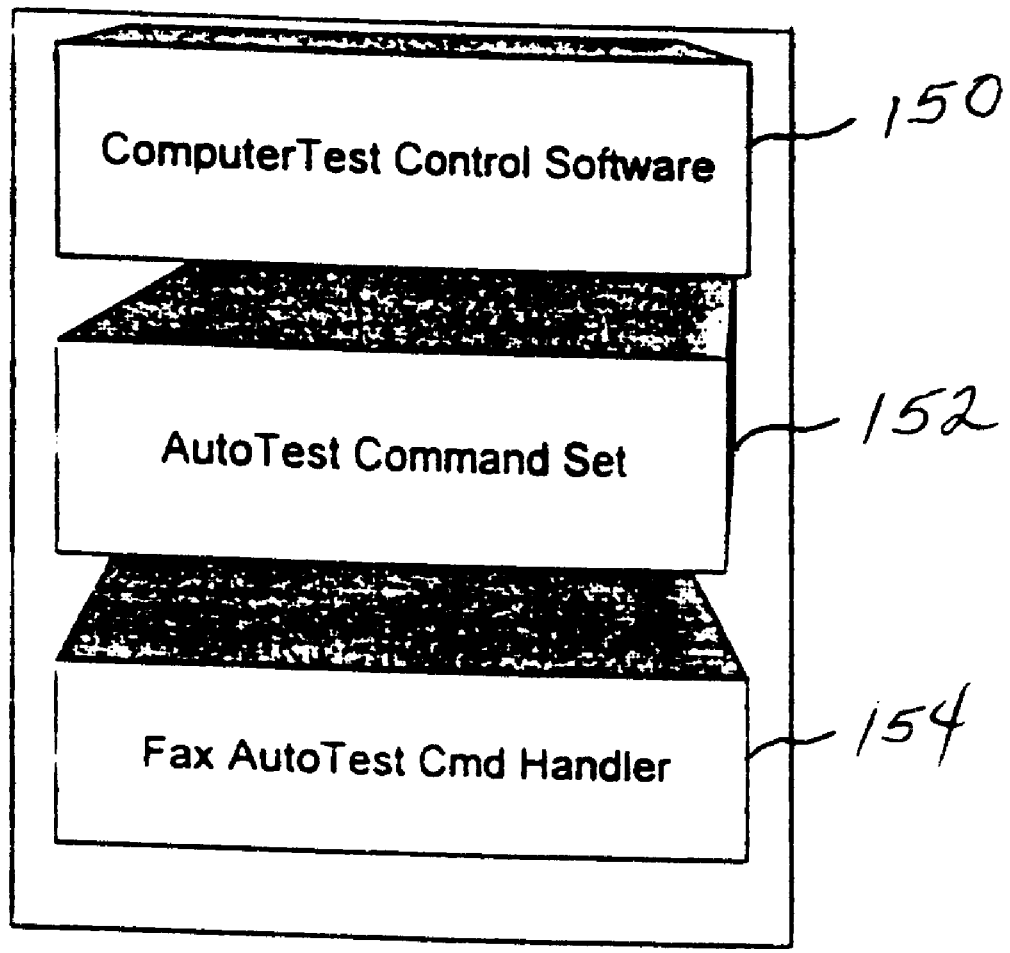
FIG. 4 is a block diagram of an exemplary automated testing system of the present invention.

FIG. 4 is a block diagram illustrating components of an exemplary automated testing system of the present invention. A Computer Test Control Software component 150 reads a predefined test script file and prepares a test sequence specified in the file. In this context, a test sequence is a series of related tests grouped together. For example, a series of tests could be grouped together which have only one testing parameter changed, for example, baud rate, keeping all other testing parameters the same in order to test the influence of a change in baud rate on the tested machine.

The computer 60 of FIG. 2, for example, may perform these functions. The test sequence is translated into commands executable by the facsimile machine being tested, for example, the facsimile machine 64 of FIG. 2, and these commands are then transmitted to the facsimile machine 64. The facsimile machine 64 then executes the commands as transmitted from the computer 60, and returns to the computer 60 testing results. The Computer Test Control Software component 150 of FIG. 4 then logs the test conditions and results by executing appropriate software code in, for example, the computer 60 of FIG. 2.

A Fax AutoTest Cmd Handler 154 of FIG. 4 is a software component to be executed by the facsimile machine to be tested, for example, the facsimile machine 64 of FIG. 2. The software causes the facsimile machine 64 to parse the commands which have been transmitted to the facsimile machine 64 by the computer 60, through, for example a serial port on the facsimile machine 64, and then causes the facsimile machine 64 to execute the commands and transmit results back to the computer 60.

An AutoTest Command Set 152 component of FIG. 4 includes a command to change protocol mode, for example, ASYNCHRONOUS, COMPATIBLE, RICOH, or MILSTD, to change image quality, such as, for example, STANDARD, DETAIL, or FINE, to set halftone ON or OFF, and to set the number of pages to be sent. The AutoTest Command Set 152 component also includes a command to order the machine to be tested to start transmission after the mode has been set.

The commands sent by the computer 60 of FIG. 2 are in the format of frames, which are a stream of bits or characters wrapped by a header and a trailer. The command frame is designed to ensure reliable communication between the computer 60 and the facsimile machine 64, and is discussed in more detail with regard to FIGS. 9A–9G below.

Figure 5:
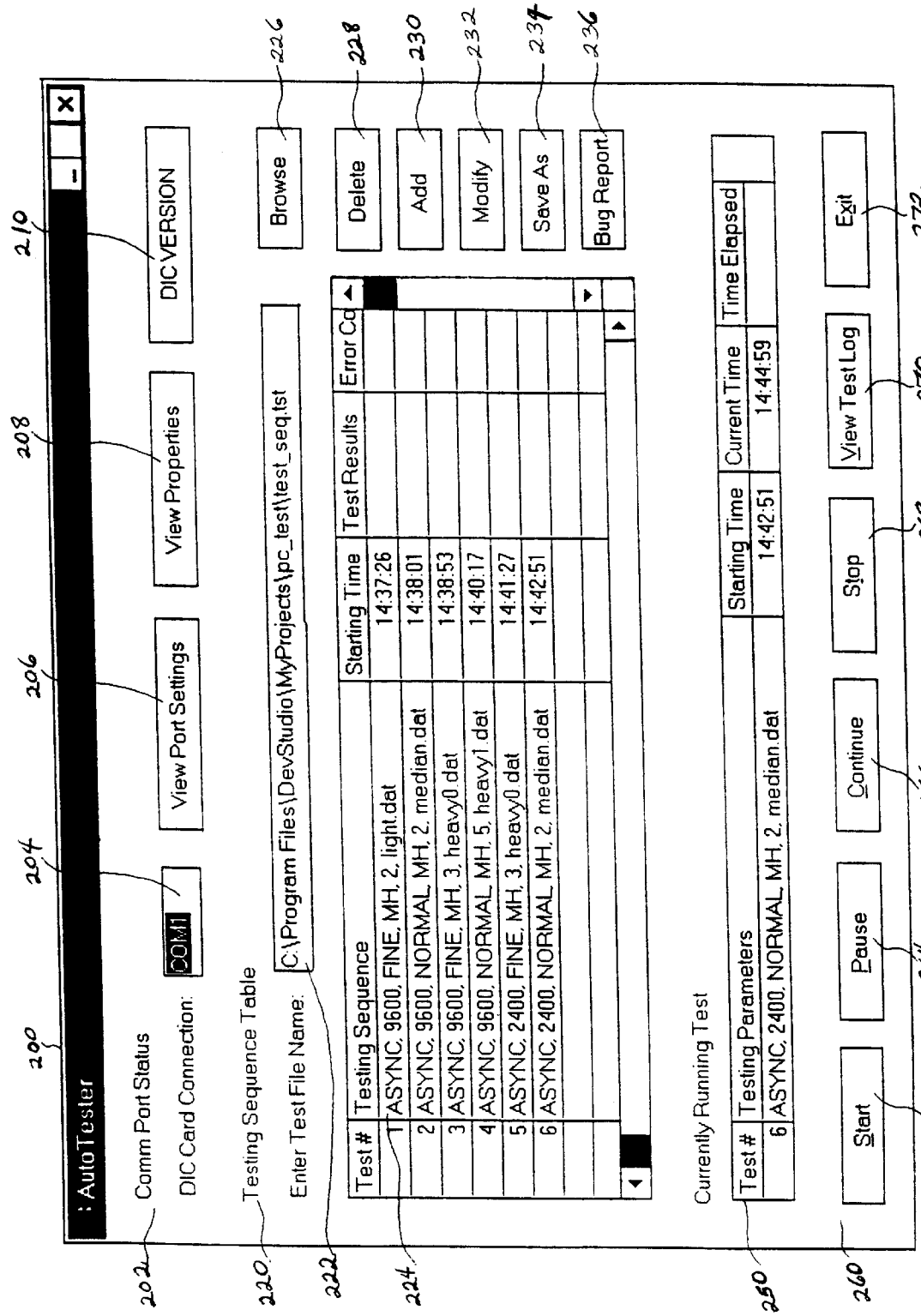
FIG. 5 illustrates an exemplary user interface for the computerized automated system testing control of the present invention.

FIG. 5 illustrates an exemplary computer AutoTester control software user interface 200 for the computerized automated system testing control of the present invention. The computer AutoTester control software user interface 200 includes, for example, four display areas, including a Comm Port Status area 202, a Testing Sequence Table area 220, a Currently Running Test area 250, and a command buttons area 260. The software controlling the user computer AutoTester control software user interface 200 may be conveniently implemented on, and displayed on, for example, a display device connected to the computer 60 of FIG. 2. Clearly, not every feature shown in the display areas is required to be displayed by a user interface, and, clearly, additional features may also be displayed, without departing from the spirit and scope of the present invention.

The Comm Port Status area 202 of FIG. 5 includes, for example, a text field 204 and a View Port Settings button 206, a View Properties button 208, and a DIC Version button 210 for viewing a communication port status. The Testing Sequence Table area 220 includes a text field 222 for displaying the name of a test sequence file to be used for testing, for example, the facsimile machine 64 of FIG. 2. A table 224 displays, for example, a test number, a testing sequence, and values relating to the testing status, for example, the test starting time, test results, and error codes. The user of the AutoTester control software user interface 200 may type in a test sequence file name or select a test sequence file by, for example, clicking a Browse button 226 to browse file directories for file selection.

In order for the user to manage the test of, for example, the facsimile machine 64 of FIG. 2, the Testing Sequence Table area 220 of FIG. 5 includes the Browse button 226 as discussed previously, a Delete button 228, an Add button 230, a Modify button 232, a Save As button 234, and a Bug Report button 236. After the user has selected a test from the table in the Testing Sequence Table area 220, the Delete button 228 allows the user to delete the selected test from the table. After the user has selected a test from the table in the Testing Sequence Table area 220, the user may press the Add button 230 so that a selection dialog for testing parameters, as discussed below with regard to FIG. 6, is displayed to enable the user to add a new test with desired testing parameters immediately after the selected test.

After the user has selected a test from the table in the Testing Sequence Table area 220 of FIG. 5, the user may press the Modify button 232 so that the selection dialog for testing parameters, as discussed below with regard to FIG. 6, is displayed, showing the values from the original test to enable the user to modify the test with desired different testing parameters. After the user has selected a test from the table in the Testing Sequence Table area 220 of FIG. 5, the user may press the Save As button 234, and a File Save dialog (not shown) may be displayed to enable the user to save the test into a new file. By pressing the Bug Report button 236, the user may request a display of the bug report for a selected test.

The Currently Running Test area 250 of FIG. 5 lists which test is currently running, its starting time, the current time, and time elapsed for running the test.

The command buttons area 260 includes a Start button 262 to enable the user to start a sequence of tests, a Pause button 264 to enable the user to pause a test at any time, a Continue button 266 to enable the user to resume a test after the testing has been paused, a Stop button 268 to enable the user to stop a test at any time, a View Test Log button 270 to enable the user to view the test log at any time, and an Exit button 272 to enable the user to terminate the program promptly. A programmer skilled in the art of programming may easily write program code to achieve the functionalities as described above with regard to the AutoTester control software user interface 200.

The present invention has been implemented using the Microsoft Visual C++ Compiler (Version 5.0) to produce PC AutoTest Control software, including the graphical user interface. However, any other compiler on any other operating system which may be used on computer which may communicate with office devices may be used to produce control software and user interfaces according to the present invention.

FIG. 6 illustrates an exemplary user interface for a selection dialog for selecting testing parameters for a new test or for a modification of an existing test 300 according to the present invention. Included for display in the user interface for a selection dialog for selecting testing parameters for a new test or for a modification of an existing test 300 are, for example, a Protocol Selection area 302 for selecting Asynchronous, Compatible, RICOH, or MILSTD protocol, and a Compression area 304 for selecting, for example, Un-compressed, MH Coding, MR Coding, or MMR Coding. Also, an Asynchronous Protocol area 306 enables the user to select, for example, a line speed, to display a time out, and to select an EFC ON or OFF, a Duplex mode, a line delay, and a Flow Control. A Synchronous Protocol area 308 enables the user to select, for example, a Baud Rate, a Hand Shake OFF or ON, a Forward Error Correction (FEC) ON or OFF, a line, and a Duplex mode. A printing Quality area 310 enables the user to select, for example, a Resolution, a Halftone ON or OFF, and a number of pages to be sent.

An Apply button 320 enables the user to apply the features currently selected on the user interface for a selection dialog for selecting testing parameters for a new test or for a modification of an existing test 300 for a test which has been selected in the Testing Sequence Table area 220 of FIG. 5, and which has been requested to be added or modified as described previously with regard to the Add button 230 and the Modify button 232 of FIG. 5. If the Apply button 320 of FIG. 6 is pressed, the selected test script file will be modified according to the testing parameters which have been selected by the user. Also, the testing sequence table will be updated with the newly selected testing parameters. A Default Value button 322 of FIG. 6 enables the user to select a default value of parameter values shown in the user interface for a selection dialog for selecting testing parameters for a new test or for a modification of an existing test 300. A Cancel button 324 enables the user to cancel a request to add or modify a test and return to the AutoTester control software user interface 200 of FIG. 5, or another user interface which may have been used to call the user interface for a selection dialog for selecting testing parameters for a new test or for a modification of an existing test 300.

The user interfaces shown in FIGS. 5–6 are exemplary user interfaces which are used as a convenience to the user to graphically display the features as discussed above with regard to FIGS. 5–6. However, any type of user interface may be alternatively used, including, for example, a line-by-line prompt requesting entry of desired parameter values or a full menu screen displaying all parameters for which values may be entered by the user. Batch input may alternatively be used.

Figure 7:
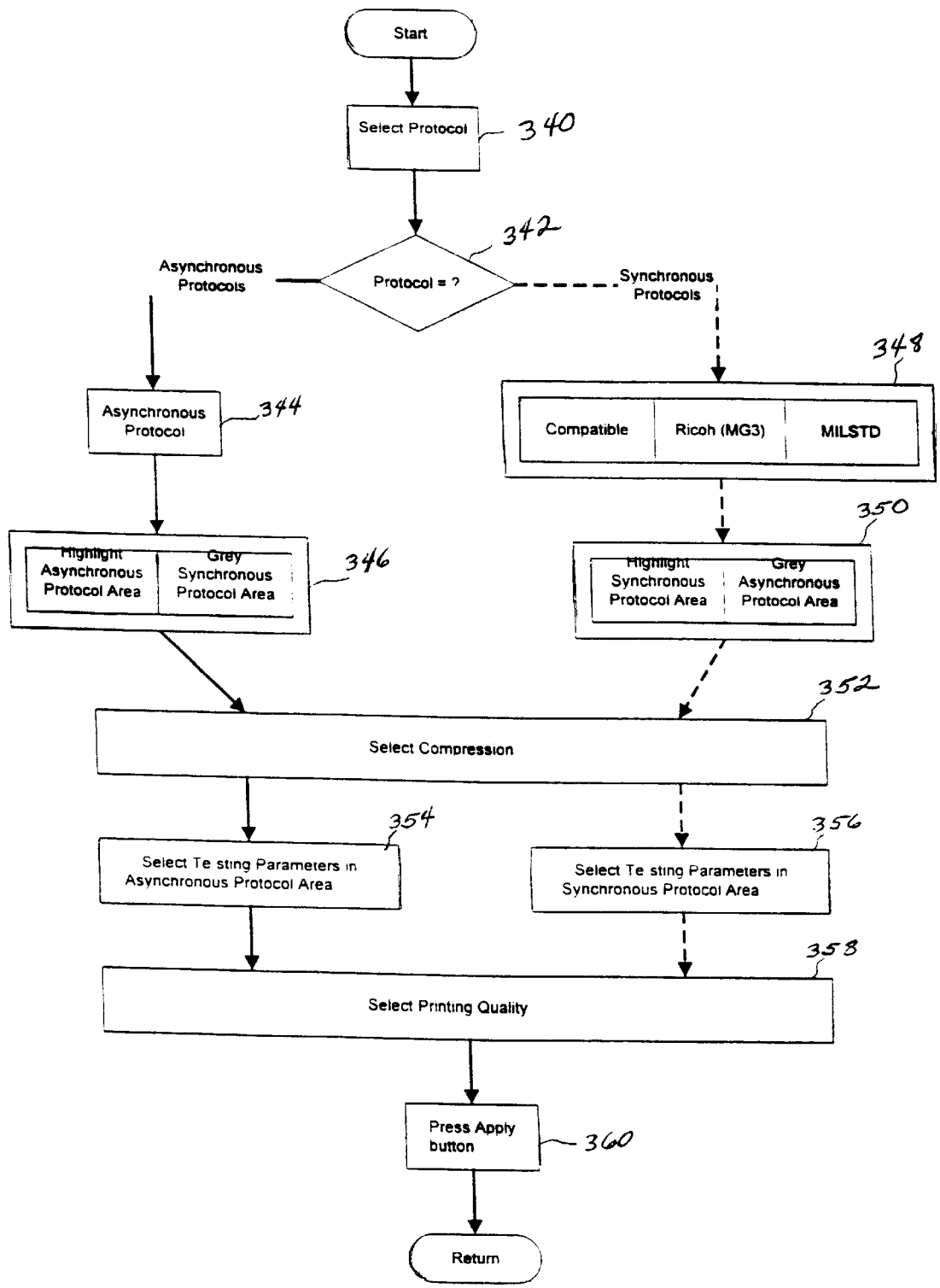
FIG. 7 is a flowchart illustrating exemplary logic for the user interface of FIG. 6.

FIG. 7 is a flowchart showing exemplary logic for the user interface of FIG. 6. After starting, step 340 selects a protocol in the protocol selection section 302 of FIG. 6. Step 342 of FIG. 7 determines whether a synchronous or asynchronous protocol was selected in step 340. If step 342 determines that an asynchronous protocol was selected, then step 344 recognizes that an asynchronous protocol was selected, and step 346 highlights the asynchronous protocol area 306 and greys the synchronous protocol area 308 of FIG. 6. Step 352 of FIG. 7 selects compression in the compression area 304 of FIG. 6. Step 354 selects testing parameters in the asynchronous protocol area 306 of FIG. 6. Step 358 of FIG. 7 selects a printing quality from the printing quality section 310 of FIG. 6. Step 360 of FIG. 7 then presses the apply button 320 of FIG. 6, and control is returned to the system for modifying the script file and updating the testing sequence table as discussed previously with regard to FIG. 6.

If step 342 determines that a synchronous protocol was selected, then step 348 recognizes which synchronous protocol was selected, and step 350 highlights the synchronous protocol area 308 and greys the asynchronous protocol area 306 of FIG. 6. Step 352 of FIG. 7 selects compression in the compression area 304 of FIG. 6. Step 356 selects testing parameters in the synchronous protocol area 308 of FIG. 6. Step 358 of FIG. 7 selects a printing quality from the printing quality section 310 of FIG. 6. Step 360 of FIG. 7 then presses the apply button 320 of FIG. 6, and control is returned to the system for modifying the script file and updating the testing sequence table as discussed previously with regard to FIG. 6.

Figure 8A:
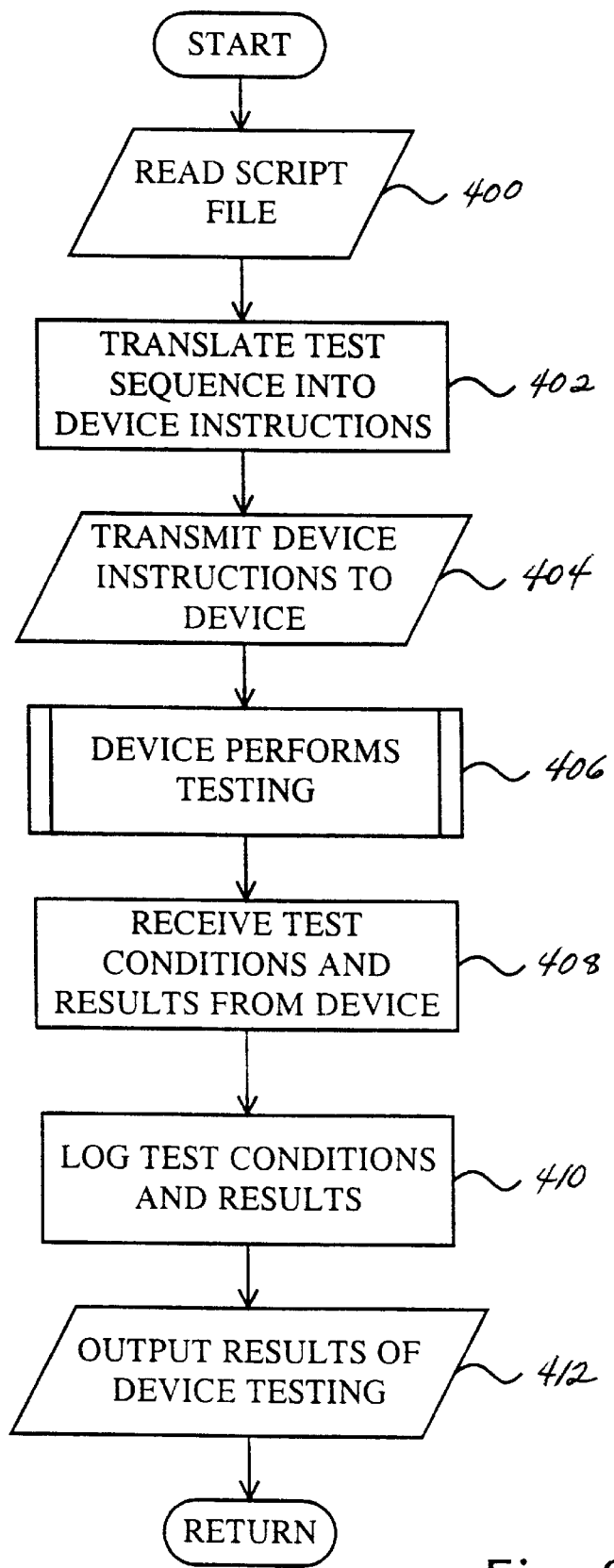
FIGS. 8A and 8B are flowcharts illustrating exemplary logic for the exemplary automated testing shown in FIG. 4.
Figure 8B:
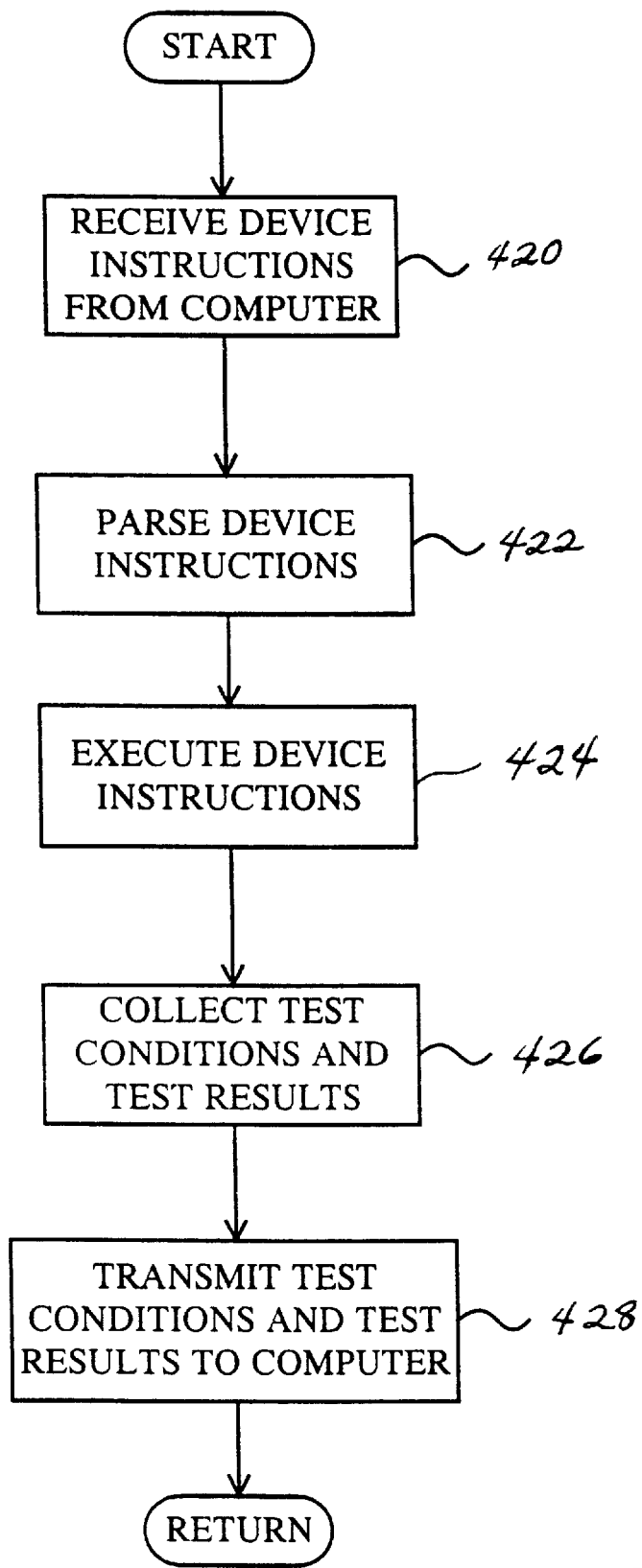

FIGS. 8A and 8B are flowcharts illustrating exemplary logic for the exemplary automated testing shown in FIG. 4. FIG. 8A shows exemplary logic for execution by the computer 60 of FIG. 2 in setting up instructions to be executed by the facsimile machine 64 of FIG. 2 for testing, and for exemplary logic to be executed by the computer 60 after receiving test results back from the facsimile machine 64. After starting, step 400 of FIG. 8A reads a script file. Step 402 then translates a test sequence in the script file into device instructions to be executed by the facsimile machine 64 of FIG. 2. Device instructions are instructions which the device can understand, as shown in more detail, and as discussed with regard to FIGS. 9A–9G below. Step 404 of FIG. 8A then transmits the device instructions to the device, for example, the facsimile machine 64 of FIG. 2. In step 406 of FIG. 8A, the device performs testing, as discussed below with regard to FIG. 8B.

Step 408 of FIG. 8A receives test conditions and test results from the device. Test conditions are a collection of testing parameter values under which the facsimile 64 is tested or operated. Test conditions include the parameters of protocol, compression, resolution, number of pages transmitted, and a firmware code version. Test results generally have one of two values, either "pass" or "fail". If the value is "pass," the error code value may be zero, while if the value is "fail", the error code may be a non-zero value indicating what type of error occurred.

Step 410 then logs the test conditions and test results, step 412 outputs results of the testing of the device, and control is returned to the calling system.

FIG. 8B illustrates logic to be executed by the device, for example, the facsimile machine 64 of FIG. 2, after the computer 60 has transmitted the device testing instructions to the device, as discussed previously with regard to step 406 of FIG. 8A. After starting, step 420 of FIG. 8B receives device instructions for testing the device from the computer. Step 422 then parses the device instructions. Step 424 then executes the device instructions in order to perform the test requested by the computer. Step 426 collects test conditions and test results, step 428 transmits the test conditions and test results to the computer, and control is returned to the calling system.

Steps 400, 402, 404, 408, 410 and 412 of FIG. 8A are exemplary logic included in the Computer Test Control Software component 150 as discussed previously with regard to FIG. 4. Steps 420, 422, 424, 426, and 428 of FIG. 8B are exemplary logic included in the Fax AutoTest Cmd Handler 154 as discussed previously with regard to FIG. 4.

FIGS. 9A–9G are block diagrams of layouts for exemplary commands for the automated diagnostic testing. Commands sent by the computer 60 of FIG. 2 to the facsimile 64 are in the format of frames, which are streams of characters wrapped by a header and a trailer. FIG. 9A illustrates the structure of a frame 449. Every command begins with a "PC" or "DI" string 450, or header, wherein a value of "PC" indicates that the frame is being sent from the computer 60 to the facsimile 64 of FIG. 2, and a value of "DI" indicates that the frame is being sent from the facsimile 64 to the computer 60 of FIG. 2.

A cmd_len string 452 indicates a command length in bytes. A command string 454 is the command which is being transmitted, as discussed below with regard to FIGS. 9B(1)–9G. An ETX character 456 indicates the end of the frame, or the trailer. For "PC" frames, a parser in the facsimile 64 of FIG. 2 first strips off the header 450 of FIG. 9A and trailer 456 and then decodes the command 454 for execution.

FIGS. 9B(1)–9G illustrate the structures of commands 454. For this example, each parameter in each cell is one byte in size unless the size is explicitly specified. Timeout for all commands is three seconds. FIG. 9B(1) illustrates the structure of a program/report mode settings, or "m" command which includes the character 'm' in byte 460.

A KEYNUM 462 specifies a user function key number (e.g., 1, 2, . . . , 64). A MOD field 464 specifies a protocol mode (e.g., 'A' for Async, 'M' for MG3, 'V' for Valuetek, and '1' for 161D). A SYNC LIST field 466 specifies the parameters pertinent to the synchronous protocol, as discussed below with regard to FIG. 9B(2). An ASYNC LIST 468 specifies pertinent to the asynchronous protocol, as discussed below with regard to FIG. 9B(3).

FIG. 9B(2) illustrates a structure of the SYNC LIST 466 of FIG. 9B(1). An HS ("Hand Shake") field 470 indicates a value of "Off" or "On" (e.g., '0' for broadcast or '1' for handshake). A LN field 472 indicates a type of line (e.g., '0' for leased, or point-to-point, and '1' for dial up, or switched). A COD field 474 indicates a type of coding (e.g., '0' for uncompressed, '1' for MH coding, '2' for MR coding, or '3' for MMR coding). A DP field 476 indicates a duplex mode for a modem (e.g., '0' for half duplex or '1' for full duplex). An FEC field 478 indicates whether FEC ("Forward Error Correction") is on or off (e.g., '0' for off or '1' for on).

FIG. 9B(3) illustrates a structure of the ASYNC LIST 468 of FIG. 9B(1). An LS field 480 indicates a line speed (e.g., '1' for 1200 BPS, '2' for 2400 BPS, . . . ). A TO field 482 indicates a value of time-out in seconds. An LD field 484 indicates a value of line delay time, for example, from 0 to 100 msec. A DP field 486 indicates a duplex mode for a modem (e.g., '0' for half duplex or '1' for full duplex). A COD field 488 indicates a type of coding (e.g., '0' for uncompressed, '1' for MH coding, '2' for MR coding, or '3' for MMR coding).

An EFC field 490 indicates whether EFC is "On" or "Off" (e.g., '0' for off or '1' for on). An FC field 492 indicates flow control (e.g., '0' for CTS flow control or '1' for XON/XOFF). An SI field 494 indicates a switch interface status (e.g., '0' for "On" or '1' for "Off"). A BK field 496 indicates whether break is set to "On" or "Off."

If the "m" command 460 is sent from the fax control unit ("FCU") of the facsimile 64 to the computer 60 of FIG. 2, the command is reporting the mode settings associated with the user function key 462 specified in the command. If the command is sent from the computer 60 to the FCU of the facsimile 64 of FIG. 2, the command requires the FCU to read the user function key number 462 and program the user function key according to the parameters specified in the fields MOD 464, SYNC LIST 466 and ASYNC LIST 468.

FIG. 9C illustrates the structure of a select mode, or "c" command which includes the character 'c' in byte 500. The "c" command is sent from the computer 60 to the FCU of the facsimile 64 of FIG. 2 to request the FCU to set the user function key number specified in a KEYNUM field 502 of FIG. 9C as the current transmitting protocol mode.

FIG. 9D illustrates the structure of a start transmitting, or "w" command which includes the character 'w' in byte 504. The "w" command is sent from the computer 60 to the FCU of the facsimile 64 of FIG. 2 to request the FCU to start transmitting immediately, analogous to a user pressing a start button on a fax control panel. A RES field 506 indicates a resolution (e.g., '0' for 100×100 DPI, '1' for 100×200 DPI, etc.). A HFTN field 508 indicates whether half-tone is set to "On" or "Off." A NUM OF PAGES field 510 indicates a number of pages to be transmitted.

FIG. 9E illustrates the structure of a query mode, or "q" command which includes the character 'q' in byte 512. The "q" command is sent from the computer 60 to the FCU of the facsimile 64 of FIG. 2 to request the FCU to query the mode settings associated with the user function key number specified in a KEYNUM field 514 of FIG. 9E. The FCU should respond to the "q" command with an "m" command, as discussed previously with regard to FIGS. 9B(1)–9B(3).

FIG. 9F illustrates the structure of a tests result report, or "r" command which includes the character 'r' in byte 516. The "r" command is sent from the FCU of the facsimile 64 of FIG. 2 to the computer 60 to report the test result and error message(s) in ASCII once the transmission is complete or has an error. An ERR field 518 of FIG. 9F indicates an error code which is defined by each different type of equipment being used. For example, an error code of zero may indicate a successful transmission, and an error code of "0×01" may indicate that a timeout error has occurred. An Error Message field 520 indicates an error message. The "r" command is transmitted from the FCU through the DIC to the computer 60 of FIG. 2.

FIG. 9G illustrates the structure of an abort test, or "a" command which includes the character 'a' in byte 522. The "a" command is sent from the computer 60 to the FCU of the facsimile 64 of FIG. 2 to request the FCU to stop transmitting immediately, automatedly analogous to a user pressing a stop button on a fax control panel.

Figure 10A:
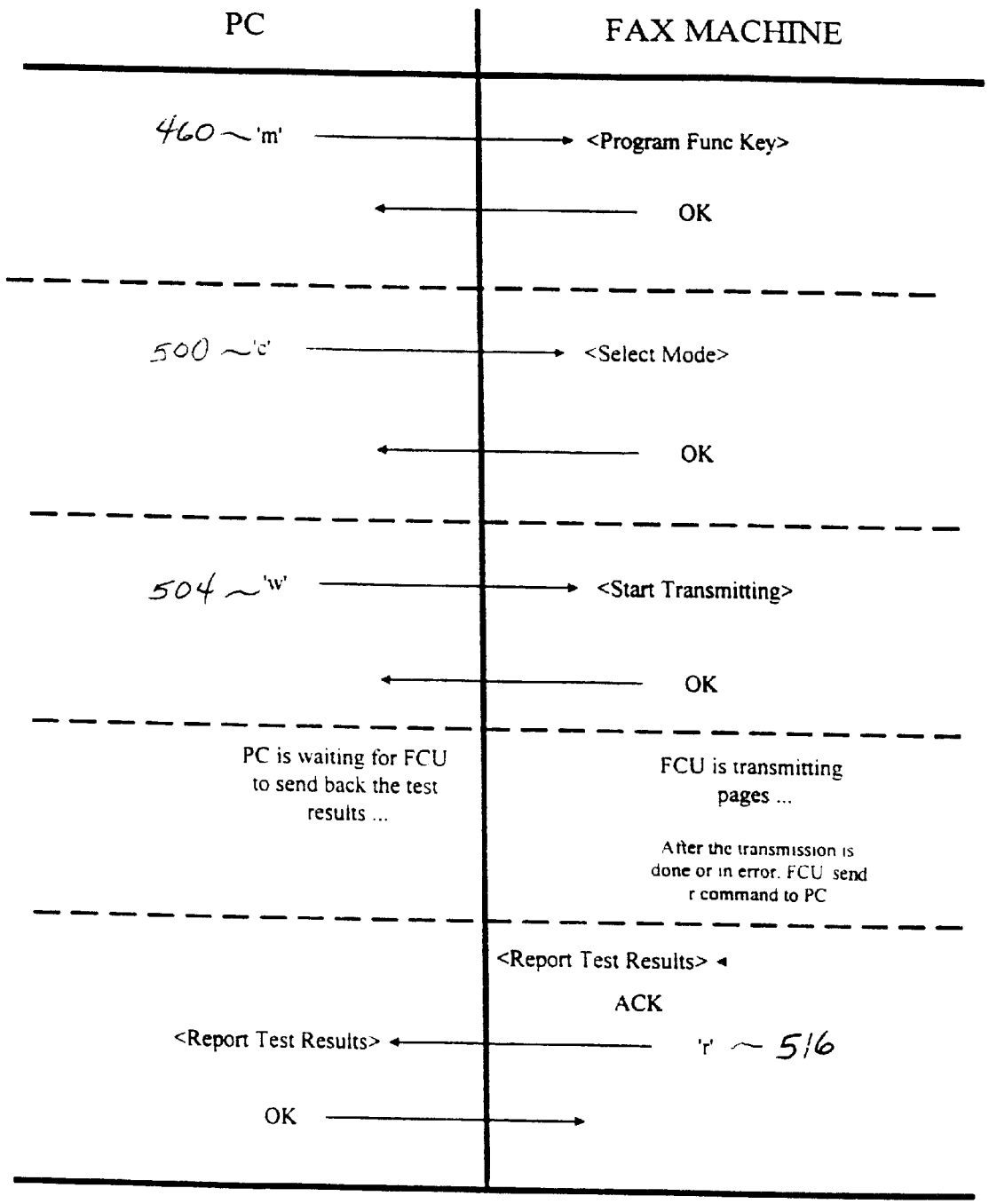
FIG. 10A illustrates an exemplary PC control transmission handshaking protocol between a PC and the facsimile machine to be tested.
Figure 10B:
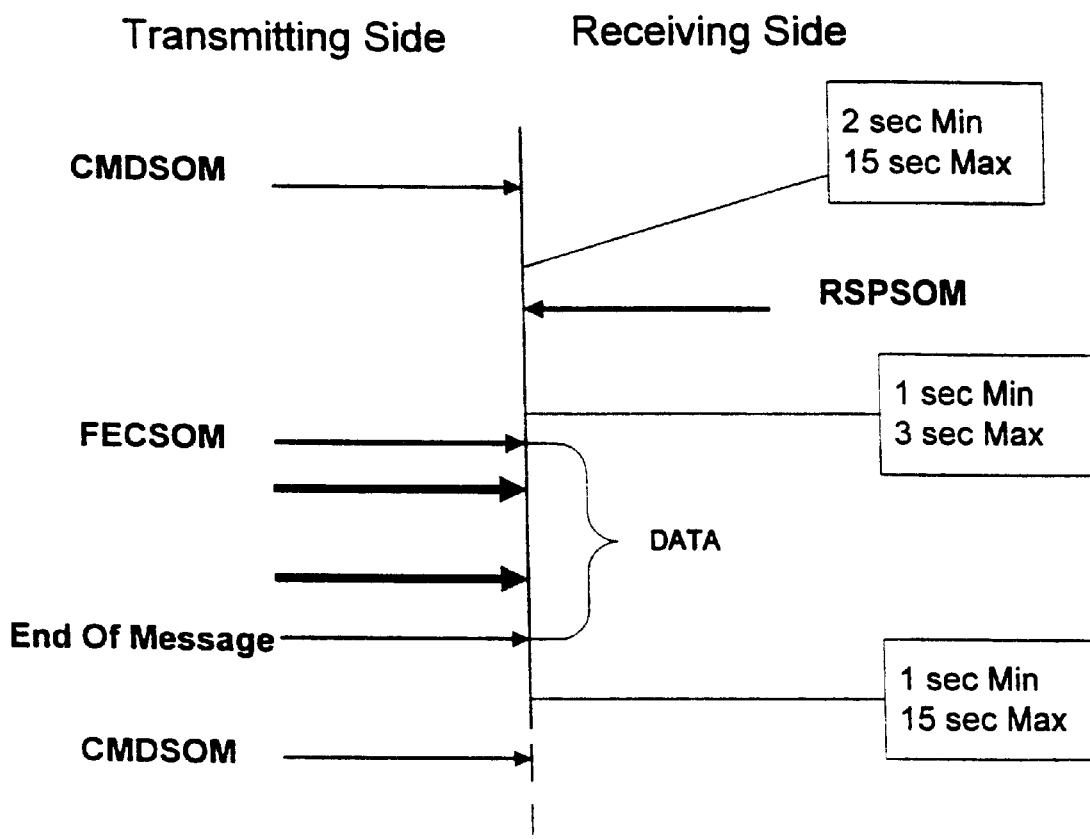
FIG. 10B illustrates an exemplary handshaking protocol between a local fax and a remote fax.

FIG. 10A illustrates an exemplary PC control transmission handshaking protocol between a PC, for example, the computer 60 of FIG. 2, and the facsimile machine to be tested, for example, the facsimile 64 of FIG. 2. The remote fax machine 88 is used for a reception test. A preprogrammed number of pages are loaded on the local facsimile 64 and the facsimile 64 waits for a command from the computer 60. As shown in FIG. 10A, the computer 60 begins the test by sending an "m" command 460 to the facsimile 64 to request that the FCU program the selected user function key with the protocol parameters specified in the command, as discussed previously with regard to FIGS. 9B(1)–9B(3). The facsimile 6 transmits a signal indicating 'OK' to the computer 60. After the computer 60 receives the 'OK,' the computer 60 sends a 'c' command 500 to the facsimile 64 to request that the FCU set the selected user function key as the current transmitting protocol mode, as discussed previously with regard to FIG. 9C. The facsimile 64 sends a signal indicating 'OK' to the computer 60.

After the computer 60 receives the 'OK,' the computer 60 transmits a 'w' command 504 to the facsimile 64 to request that the FCU start transmitting the specified number of pages, as discussed previously with regard to FIG. 9D. The computer 60 then enters an idle state to wait for the FCU to report test results. After the FCU has completed the test, the facsimile 6 sends an 'r' command to the computer 60, as discussed previously with regard to FIG. 9F. The computer 60 then decodes the test results and enters the test results into the log file. Up to this point, the first test in the test sequence has been finished. The computer 60 will continue to perform the next test specified in the test sequence script file. The testing continues until all the tests specified in the test sequence file have been completed.

In transmitting commands, the computer 60 tries to send a command, for example, three times if an indication of 'OK' is not received from the facsimile 64. If these three tries all fail, the computer 60 generates an error indicating that the facsimile 64 is not responding. If the FCU is not ready or in an error state, the facsimile 64 should transmit an 'r' command to the computer to indicate that the FCU is not responding.

FIG. 10B illustrates an exemplary handshaking protocol between the local facsimile 64 and the remote fax 88. The protocol illustrates a MIL-STD-161D handshaking protocol.

FIG. 11 is an exemplary bug report form 530, and FIG. 12 is an exemplary bug report 540. Bug reports were discussed previously with regard to FIG. 3.

The facsimile machine may be a non-secure facsimile machine, a secure fax machine, a fax machine configured to transmit and/or receive electronic mail, or a facsimile machine configured to send/receive messages to/from Internet Protocol ("IP") addresses. The device to be tested is not intended to be limited to a facsimile machine, but may include other devices such as printers.

Figure 13:
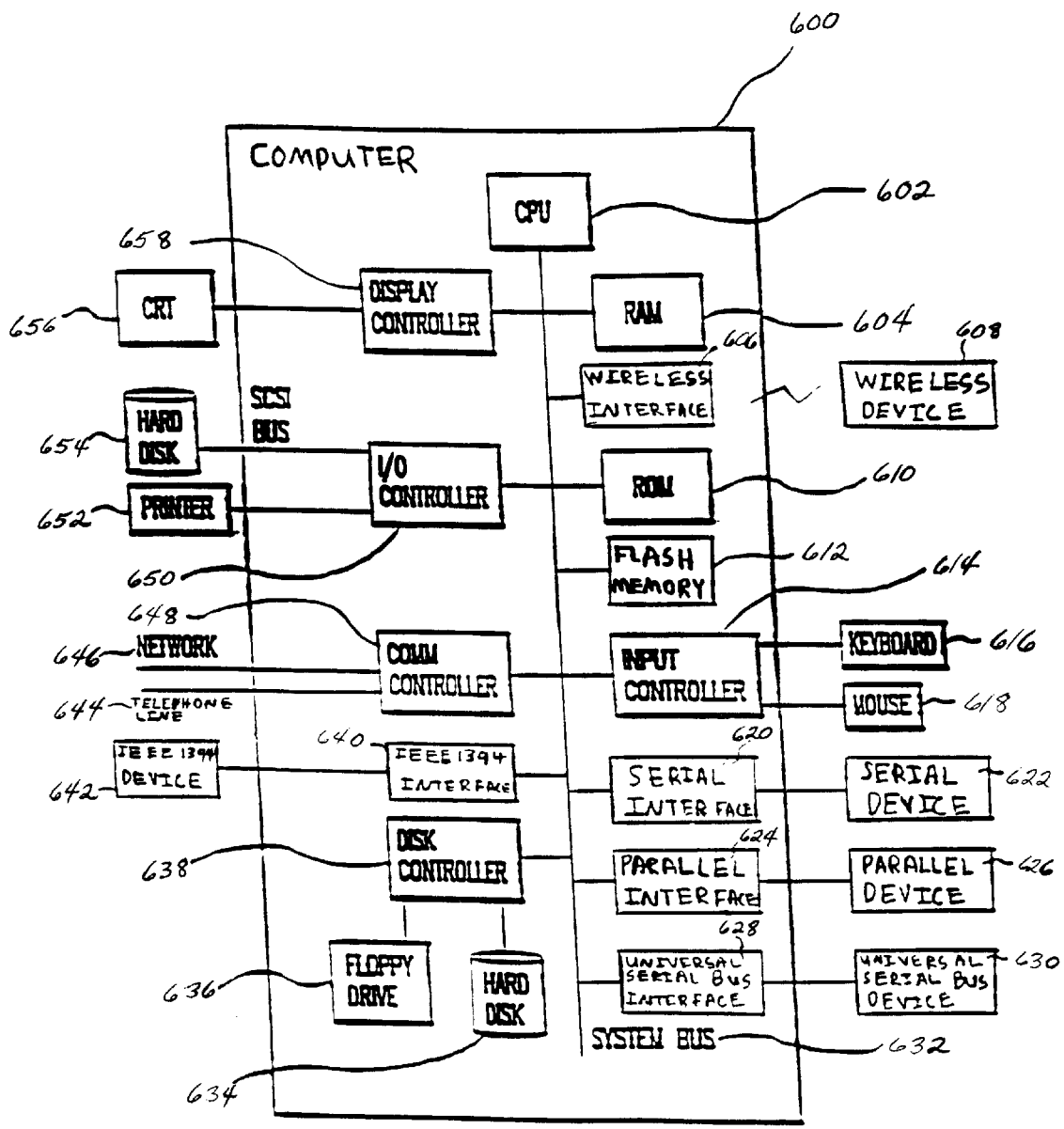
FIG. 13 is a block diagram of an exemplary computer which may be connected to the facsimile machine to control the automated testing.

An exemplary computer utilized by the present invention, including the computer 60 of FIG. 2, is shown as a block diagram in FIG. 13. Further, any other computer utilized by this invention may be implemented in a similar manner to the computer illustrated in FIG. 13, if desired. However, not every element illustrated in FIG. 13 is required in each of these computers. In FIG. 13, the computer 600 includes a CPU 602 which may be implemented as any type of processor including commercially available microprocessors from companies such as Intel, Motorola, Hitachi and NEC, for example. There is a working memory such as a RAM 604, and a wireless interface 606 which communicates with a wireless device 608. The communication between the interface 606 and device 608 may use any wireless medium such as radio waves, or light waves, for example. The radio waves may be implemented using a spread spectrum technique such as Code Division Multiple Access ("CDA") communication or using a frequency hopping technique.

There is a ROM 610, and a flash memory 612, although any other type of nonvolatile memory may be utilized in addition to or in place of the flash memory 612 such as an EPROM, or an EEPROM, for example. An input controller 614 has connected thereto a keyboard 616 and a mouse 618. There is a serial interface 620 connected to a serial device 622. Additionally, a parallel interface 624 is connected to a parallel device 626, a universal serial bus interface 628 is connected to a universal serial bus device 630, and also there is an IEEE 1394 device 642, commonly referred to as a fire wire device, connected to an IEEE 1394 interface 640. The various elements of the computer 400 are connected by a system bus 632. A disk controller 638 is connected to a floppy disk drive 636 and a hard disk drive 634. A communication controller 648 allows the computer 600 to communicate with other computers, or send email messages, for example over a telephone line 644, or a network 646. An I/O (Input/Output) controller 650 is connected to a printer 652 and a hard disk 654, for example using a SCSI (Small Computer System Interface) bus. There is also a display controller 658 connected to a CRT (Cathode Ray Tube) 656, although any other type of display may be used including a liquid crystal display, a light emitting diode display, a plasma display, etc.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs. RAMs, EPROMS, EEPROMS, magnetic or optical cards, or any type of media suitable for storing electronic instructions.

Thus, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 600 and for enabling the computer 600 to interact with a human user. Such software may include, but is not limited to, device drivers, operating systems and user applications, such as development tools. Such computer readable media further includes the computer program product of the present invention. Computer code devices of the present invention can be any interpreted or executable code mechanism, including but not limited to scripts, interpreters, dynamic link libraries, Java classes, and complete executable programs.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patents of the United States is:

1. An automated method of testing a device which has a connection to a computer, the method comprising the steps of:

inputting, to the computer, a test sequence;

translating, by the computer, the test sequence into at least one device instruction;

transmitting, from the computer to the device, the at least one device instruction;

receiving, by the computer from the device, at least one of at least one test condition of testing the device, and at least one result of testing the device; and logging, by the computer, the at least one of the at least one test condition and the at least one result so as to generate a bug report for debugging the device prior to shipment of the device to a marketplace, wherein each one of the at least one test condition comprises at least one of a value indicating a secure communication protocol and a value indicating a compression, and wherein the at least one result indicates whether or not testing of the secure communication protocol and the compression passed or failed.

2. A method according to claim 1, further comprising the steps of:

parsing, by the device, the at least one device instruction;

executing, by the device, the at least one device instruction;

collecting, by the device, the at least one of the at least one test condition and the at least one result; and transmitting, from the device to the computer, the at least one of the at least one test condition and the at least one result.

3. A method according to claim 1, further comprising generating a communication log.

4. A method according to claim 1, wherein the step of inputting further comprises:

inputting, to the computer, a script file which includes the test sequence.

5. A method according to claim 1, wherein the at least one device instruction comprises at least one of:

a program mode setting command, a report mode setting command, a select mode command, a start transmission command, a query mode command, a tests result report command, and an abort command.

6. A method according to claim 1, wherein said each one of the at least one test condition further comprises at least one of a value indicating a resolution, a value indicating a number of pages to be transmitted, and a value indicating a version of firmware.

7. A method according to claim 1, wherein the device comprises at least one of a facsimile machine and a printer.

8. A method according to claim 7, wherein the facsimile machine comprises at least one of an Internet facsimile machine, a facsimile machine configured to transmit facsimile messages to an electronic mail address, a facsimile machine configured to transmit facsimile messages to an Internet Protocol address, a facsimile machine configured to receive facsimile messages from an electronic mail address, and a facsimile machine configured to receive facsimile messages from an Internet Protocol address.

9. A system for testing a device, the system comprising:

a computer connected to the device, the computer configured to input a test sequence, to translate the test sequence into at least one device instruction, to transmit, from the computer to the device, the at least one device instruction, to receive, from the device, at least one of at least one test condition of testing the device, and at least one result of testing the device, and to log the at least one of the at least one test condition and the at least one result so as to generate a bug report for debugging the device prior to shipment of the device to a marketplace, wherein each one of the at least one test condition comprises at least one of a value indicating a secure communication protocol and a value indicating a compression, and wherein the at least one result indicates whether or not testing of the secure communication protocol and the compression passed or failed.

10. A system according to claim 9, wherein the device is configured to parse the at least one device instruction, to execute the at least one device instruction, to collect the at least one of the at least one test condition and the at least one result, and to transmit, from the device to the computer, the at least one of the at least one test condition and the at least one result.

11. A system according to claim 9, wherein the computer is further configured to generate a communication log.

12. A system according to claim 9, wherein the computer is further configured to input a script file which includes the test sequence.

13. A system according to claim 9, wherein the at least one device instruction comprises at least one of:

a program mode setting command, a report mode setting command, a select mode command, a start transmission command, a query mode command, a tests result report command, and an abort command.

14. A system according to claim 9, wherein said each one of the at least one test condition further comprises at least one of a value indicating a resolution, a value indicating a number of pages to be transmitted, and a value indicating a version of firmware.

15. A system according to claim 9, wherein the device comprises at least one of a facsimile machine and a printer.

16. A system according to claim 15, wherein the facsimile machine comprises at least one of an Internet facsimile machine, a facsimile machine configured to transmit facsimile messages to an electronic mail address, a facsimile machine configured to transmit facsimile messages to an Internet Protocol address, a facsimile machine configured to receive facsimile messages from an electronic mail address, and a facsimile machine configured to receive facsimile messages from an Internet Protocol address.

17. A computer program product including a computer readable medium embodying program instructions thereon for causing a system to perform a method of testing a device which has a connection to a computer, the method comprising the steps of:

inputting, to the computer, a test sequence;

translating, by the computer, the test sequence into at least one device instruction; transmitting, from the computer to the device, the at least one device instruction;

receiving, by the computer from the device, at least one of at least one test condition of testing the device, and at least one result of testing the device; and logging, by the computer, the at least one of the at least one test condition and the at least one result so as to generate a bug report for debugging the device prior to shipment of the device to a marketplace, wherein each one of the at least one test condition comprises at least one of a value indicating a secure communication protocol and a value indicating a compression and wherein the at least one result indicates whether or not testing of the secure communication protocol and the compression passed or failed.

18. A computer program product according to claim 17, further comprising the steps of:

parsing, by the device, the at least one device instruction;

executing, by the device, the at least one device instruction;

collecting, by the device, the at least one of the at least one test condition and the at least one test result; and transmitting, from the device to the computer, the at least one of the at least one test condition and the at least one result.

19. A computer program product according to claim 17, further comprising generating a communication log.

20. A computer program product according to claim 17, wherein the step of inputting further comprises:

inputting, to the computer, a script file which includes the test sequence.

21. A computer program product according to claim 17, wherein the at least one device instruction comprises at least one of:

a program mode setting command, a report mode setting command, a select mode command, a start transmission command, a query mode command, a tests result report command, and an abort command.

22. A computer program product according to claim 17, wherein said each one of the at least one test condition further comprises at least one of a value indicating a resolution, a value indicating a number of pages to be transmitted, and a value indicating a version of firmware.

23. A computer program product according to claim 17, wherein the device comprises at least one of a facsimile machine and a printer.

24. A computer program product according to claim 23, wherein the facsimile machine comprises at least one of an Internet facsimile machine, a facsimile machine configured to transmit facsimile messages to an electronic mail address, a facsimile machine configured to transmit facsimile messages to an Internet Protocol address, a facsimile machine configured to receive facsimile messages from an electronic mail address, and a facsimile machine configured to receive facsimile messages from an Internet Protocol address.

* * * * *